Sept. 20, 1960 R. DOYLE 2,952,874
AIR RING FOR USE IN THE MANUFACTURE OF THERMOPLASTIC TUBING
Filed May 19, 1958 2 Sheets-Sheet 1

INVENTOR.
ROBERT DOYLE
BY Hudson and Young
ATTORNEYS

Sept. 20, 1960  R. DOYLE  2,952,874
AIR RING FOR USE IN THE MANUFACTURE OF THERMOPLASTIC TUBING
Filed May 19, 1958  2 Sheets-Sheet 2

INVENTOR.
ROBERT DOYLE
BY Hudson and Young

ATTORNEYS

United States Patent Office 2,952,874
Patented Sept. 20, 1960

2,952,874

AIR RING FOR USE IN THE MANUFACTURE OF THERMOPLASTIC TUBING

Robert Doyle, Bartlesville, Okla., assignor to Phillips Petroleum Company, a corporation of Delaware Filed May 19, 1958, Ser. No. 736,308

4 Claims. (Cl. 18—14)

This invention relates to apparatus for making continuous, seamless tubing from thermoplastic materials. In one aspect the invention relates to an air ring, for use in an apparatus for making continuous, seamless tubing, which has a substantially uniform air velocity around the inner orifice of the air ring.

It is well known in the art to form thermoplastic materials into uniform, tubular shapes by extruding the molten, thermoplastic material from a die having an annular opening. The resulting tubular shape is inflated by means of a gaseous medium usually injected through the axial portion of the die. The inflation causes an increase in the diameter of the tubing as it issues from the die and the tubing is cooled while in the inflated state. The cooled tubing is usually collapsed between two rollers and wound upon a reel. The inflating medium is thus trapped between the rolls and the die through which the molten, thermoplastic material is extruded. The quantity of the gaseous medium is selected so that the extruded tubing will be inflated to the diameter required to produce the predetermined, desired flat width when the tubing is flattened by the rolls and to produce the desired film thickness. It is necessary for the tubing to be cooled uniformly and quickly so as to obtain a uniform wall thickness of the tubing. Since the inflating pressure on the inside of the tube can be maintained substantially constant, it can be seen that the cooling air on the outside of the tube must also be substantially uniform in quantity, velocity and temperature so that the transition from the molten stage to the set stage of the thermoplastic material will be substantially uniform around the entire periphery of the tubing in order to obtain a tubing of uniform film thickness.

I have devised an improved air ring which provides a more uniform flow of air around the entire periphery of the tubing than is provided by the air rings of the prior art.

It is an object of this invention to provide a new and improved air ring for use in an apparatus for producing tubular, thermoplastic film.

It is also an object of this invention to provide a substantially uniform quantity of air to a tubular film of thermoplastic material issuing from a die.

Other and further objects will become apparent to one skilled in the art upon studying the following description of the invention and the appended drawing wherein.

Figure 1:
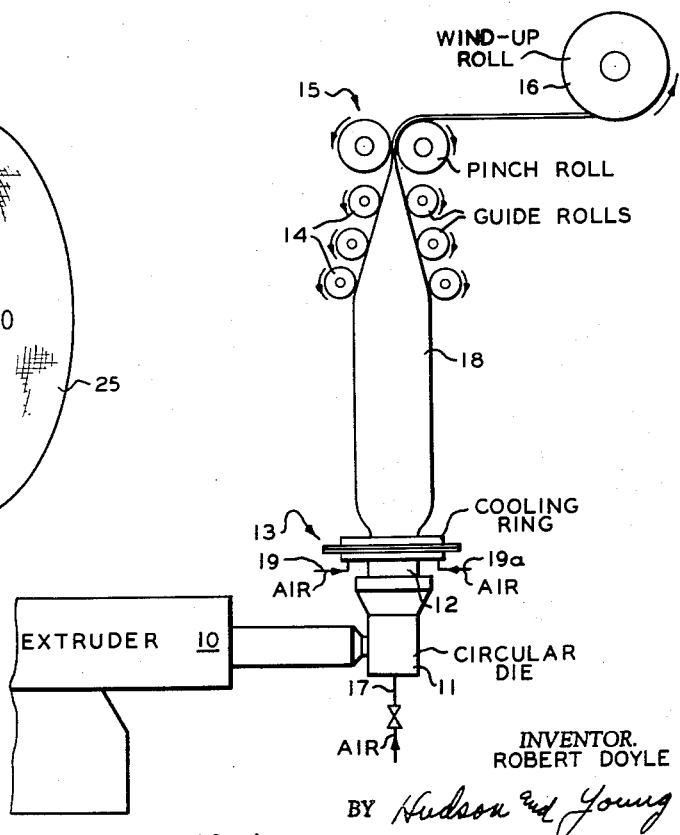
Figure 1 is a side elevation of an apparatus embodying the invention.

Referring now to the drawing, wherein like reference numerals designate like parts, and particularly to Figure 1, the reference numeral 10 designates an extruder which delivers a thermoplastic material in molten state to the circular die 11. The molten thermoplastic material issues from the circular die as a tubular film 12 and is drawn through the cooling ring 13, guide rolls 14, pinch rolls 15, and is wound on the reel 16. An inflating gas such as air is admitted through the axial portion of the circular die by means of conduit 17 and inflates the tubular film into a bubble indicated at 18. The rate of travel of the tubular film 12 is such that expansion due to the inflation gas occurs at about the air ring and the tube is cooled and set at a point above the air ring. Cooling air, or other cooling gas, is admitted to the cooling ring 13 through inlets 19 and 19a. Air is supplied at substantially constant pressure from a source (not shown) such as a blower or a large volume vessel.

Figure 2:
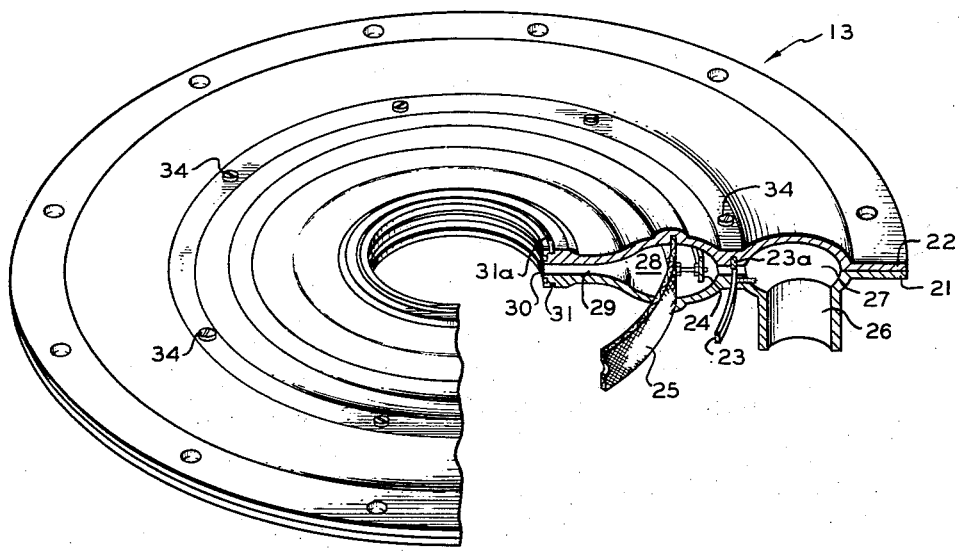
Figure 2 is an isometric view, partially in section, of the air ring of the invention.

Referring now to Figure 2, air ring 13 is made up of housings 21 and 22 which are joined together to form the air ring having therein baffles 23, 23a, 24 and 25. Air is admitted from conduit 19 or 19a via conduit 26 to the annular section 27 from whence it passes between baffles 23 and 23a, striking baffle 24 and then passing through baffle 25 which comprises a screen through which the air passes from chamber 28 into the passageway 29 and exits through the lips 30 where the air stream comes in contact with the tubular film to be cooled. Grooves 31 and 31a provide means for attaching deflectors if it is desired that the annular converging stream of air be deflected downward or upward.

Figure 4:
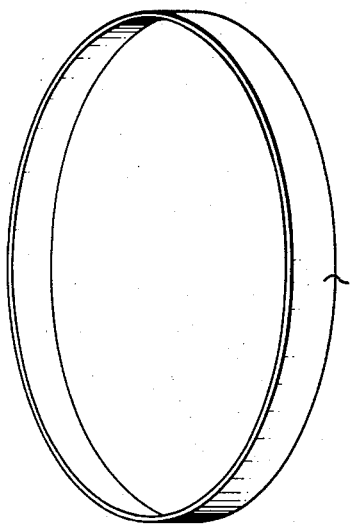
Figure 4 is an isometric view of a first baffle in the air ring of the invention.
Figure 5:
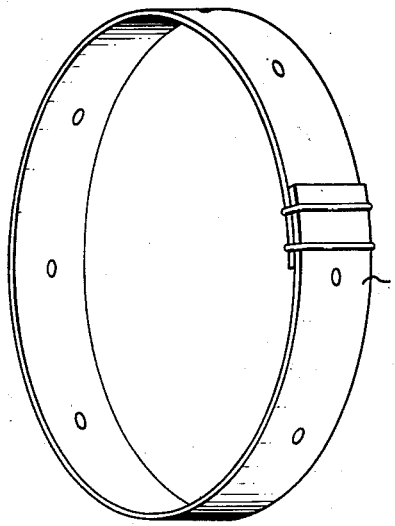
Figure 5 is an isometric view of a second baffle in the air ring of the invention.
Figure 6:
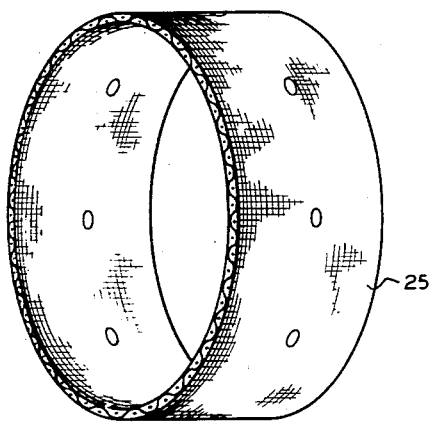
Figure 6 is an isometric view of a third baffle in the air ring of the invention.
Figure 3:
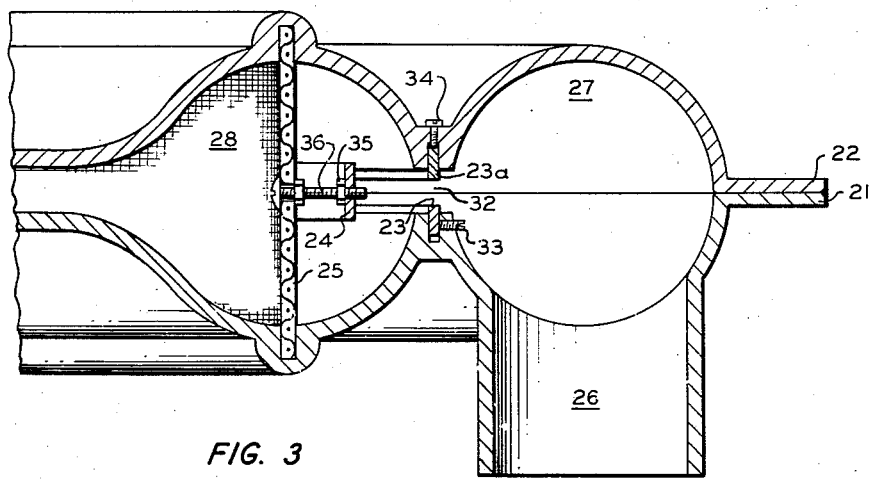
Figure 3 is a detail of a section of the air ring shown in Figure 2.

Figure 3 provides a detail view of the relative positions of the baffles in the air ring 13. Baffles 23 and 23a are substantially identical, baffle 23 being secured to housing 21 and baffle 23a being secured to housing 22 so as to provide an orifice 32 between the two substantially identical baffles. Baffle 23 is shown secured to housing 21 by set screw 33 and baffle 23a is shown secured to housing 22 by set screw 34. Baffle 23 and baffle 23a can be secured to the respective housings by either method although it is preferred to use set screws as indicated by 34 whereby the spacing between baffles 23 and 23a can be changed as desired without separating housings 21 and 22. Baffle 24 is secured to screen 25 by means of bolt 36 and its position relative to the screen 25 is determined by the position of the nut 35 on bolt 36. The baffle 24 can be telescopic as indicated in Figure 5 so as to allow adjustment with respect to screen 25, in which case the openings for the bolts 36 will be elongated slots to allow for contraction and expansion of baffle 24. Alternatively, the baffle 24 can be a solid band in which case several different diameters of baffle 24 are required in order to change the position of the baffle with respect to screen 25.

Baffle 25 is a perforated ring positioned in annular chamber 28 and serves as a spacer for housings 21 and 22 as well as serving as a baffle for the air passing through the ring. The annular orifice 30 can be modified to deflect the air at some angle upwards to cause the air to follow the tubing as it moves upward.

The ring 25 can be a woven screen or a perforated plate.

EXAMPLE I

Runs were made with the air ring of the invention as shown in Figures 1 and 2 and air flow was determined with an Alnor volometer (manufactured by the Illinois Testing Laboratory, Inc., Chicago, Illinois). The volometer was set at increments of 30 degrees around the air-outlet slot of the ring and the following readings were taken at the respective positions on the ring which had been marked off in 30 degree increments.

*Table I*

| Position (Degrees from zero) | Air Flow Rate (linear feet per minute) | Deviation from Average (percent) |
|---|---|---|
| 0 | 1,275 | 2.2 |
| 30 | 1,275 | 2.2 |
| 60 | 1,300 | 0.4 |
| 90 | 1,300 | 0.4 |
| 120 | 1,275 | 2.2 |
| 150 | 1,325 | 1.5 |
| 180 | 1,300 | 0.4 |
| 210 | 1,350 | 3.3 |
| 240 | 1,300 | 0.4 |
| 270 | 1,300 | 0.4 |
| 300 | 1,350 | 3.3 |
| 330 | 1,300 | 0.4 |

The average percent deviation is 1.4 percent.

Values were then taken with a larger volume of air being passed through the air ring. The following values were tabulated.

*Table II*

| Position (Degrees from zero) | Air Flow Rate (linear feet per minute) | Deviation from Average (percent) |
|---|---|---|
| 0 | 3,000 | 1.5 |
| 30 | 3,000 | 1.5 |
| 60 | 3,100 | 1.8 |
| 90 | 3,075 | 1.0 |
| 120 | 3,025 | 0.7 |
| 150 | 3,100 | 1.8 |
| 180 | 3,000 | 1.5 |
| 210 | 3,075 | 1.0 |
| 240 | 2,975 | 2.2 |
| 270 | 3,075 | 1.0 |
| 300 | 3,100 | 1.8 |
| 330 | 3,025 | 0.7 |

The average percent deviation was 1.3 at this higher velocity.

Thus, it can readily be seen that there is uniform air distribution about the ring regardless of the velocities utilized.

EXAMPLE II

Ethylene was polymerized in the presence of a chromium-oxide containing catalyst and the presence of a cyclohexane solvent. The polymer produced and hereafter utilized in these examples was from commercial production runs. The two different grades of polyethylene utilized which had been prepared by the above-mentioned processes have the following typical properties:

*Table III*

| Property | Polymer A | Polymer B |
|---|---|---|
| Density | 0.96 | 0.96 |
| Melt Index | 0.72 | 1.02 |
| Volatiles (percent) | 0.016 | 0.133 |
| Ash (percent) | 0.010 | 0.010 |
| Impact (ft.-lbs./in. notched) | 4.7 | 3.9 |

In all instances, a 500 c.f.m. blower was utilized to supply air to the air ring. Two different extruders were utilized, these being a 1½-inch Modern Plastics Machinery extruder manufactured by Modern Plastic Machine Corporation of Lodi, New Jersey, and also a 2½-inch National Rubber Machinery extruder manufactured by the National Rubber Machinery Company of Akron, Ohio. A 4-inch circular die manufactured by Modern Plastics Machinery Corporation was utilized on both extruders with a Modern Plastics Machinery film wind-up assembly being utilized with the Modern Plastics Machinery extruder and a Hartig Engine and Machine Company (Mountainside, New Jersey) wind-up tower being utilized with the National Rubber Machinery extruder. Also, in all instances, air was utilized as the cooling medium and as the internal expanding medium in the production of the blown tubing.

*Table IV*

| No. | Polymer [1] | Barrel Temp., °F. | | Die Temp., °F. | Extruder | Tube Diameter, Inches | Thickness, Mils | Remarks |
|---|---|---|---|---|---|---|---|---|
| | | Zone 1 | Zone 2 | | | | | |
| 1 | A | 390 | 440 | 440 | MPM [2] | 9.75 | 2 | (*) |
| 2 | A | 400 | 440 | 440 | MPM | 10.00 | 1.5 | (*) |
| 3 | B | 290 | 310 | 310 | NRM [3] | 24.0 | 6 | (*) |
| 4 | B | 290 | 310 | 310 | NRM | 24.0 | 1 | (*) |
| 5 | B | 320 | 350 | 350 | NRM | 17.0 | 8 | (*) |
| 6 | B | 290 | 310 | 310 | NRM | 16.0 | 10 | (*) |

[1] As described in Table III.
[2] MPM—Modern Plastics Machinery, Lodi, New Jersey.
[3] NRM—National Rubber Machinery, Akron, Ohio.
*Very uniform thickness and no wrinkles or creases were visible in the film.

Thus, it can be seen that when utilizing the air ring of the above identified invention, uniform film can be produced due to the uniform degree of cooling. The film produced in the above example could be rolled very evenly with no signs of wrinkles in the roll.

Numerous valves, motors and other conventional elements of equipment have not been shown in the drawing in order to simplify the presentation. Such items will be readily supplied by those skilled in the art. It is also to be understood that the processes and means described in the examples are exemplary and are not to be construed as limiting the invention.

Thus, solid polyethylene has been utilized in the examples; however, the device of the invention is applicable to preparing tubular films from other thermoplastics such as polyvinyl chloride; polyvinylidine chloride; copolymers of polyvinyl chloride and polyvinylidine chloride; other poly 1-olefins such as polypropylene; copolymers of such 1-olefins; polychloro trifluoroethylene; nylon; and the like.

The materials of construction for manufacture of the air ring and its component parts include those materials which are not adversely affected by the heat radiated from the die, which can be 500° F. or greater, and which will retain their shape under the conditions of use. Metals, such as steel, iron, brass, aluminum and the like can be used. Aluminum is generally preferred because of its strength, lightness and ease of fabrication. The air ring of the examples was cast aluminum.

Reasonable variations are possible within the scope of the disclosure without departing from the spirit and scope of the invention.

That which is claimed is:

1. An apparatus adapted to provide a substantially uniform annular converging flow of a gas comprising two adjacent and concentric, hollow tori connected by an adjustable, annular first orifice; gas inlet means in the outer torus; a gas pervious, hollow right cylinder substantially bisecting the inner torus in a plane normal to the plane of revolution of the torus; a gas impervious, hollow right cylinder, whose lateral surface area is less than that of the gas pervious cylinder and greater than the area of the annular first orifice, adjustably positioned between said gas pervious cylinder and annular first orifice and out of contact with the walls of said inner torus; an annular second orifice concentric with said tori; and an annular passageway of diminishing volume with respect to the flow of gas connecting said annular second orifice with the interior of said inner torus.

2. An apparatus according to claim 1 wherein the circumference of the gas impervious hollow right cylinder is adjustable and said cylinder is adjustably secured to said gas pervious hollow right cylinder so that the distance between said cylinder is variable.

3. In a machine adapted to extrude molten thermoplastic in the form of a continuous tube, the improvement comprising apparatus for cooling the extruded tube comprising two adjacent and concentric tubular rings; an adjustable, annular first orifice communicating between said tubular rings; gas inlet means in the outer tubular ring; a gas pervious, hollow right cylinder substantially bisecting the inner tubular ring in a plane normal to the plane of revolution of the inner tubular ring; a baffle means, having an area greater than that of said first orifice and less than that of the perforate cylinder, positioned intermediate the perforated cylinder and the first orifice and spaced from the walls of said inner tubular ring; a second annular orifice concentric with said tubular rings and with the thermoplastic tube; and an annular passageway of diminishing volume with respect to the flow of gas communicating with said second orifice and the interior of said inner tubular ring.

4. In an apparatus for forming seamless tubing from molten thermoplastic comprising a die having an annular orifice, means to extrude molten thermoplastic through said die orifice, means to withdraw tubing from said die orifice, means to maintain a substantially constant bubble of gas in the tubing between said die orifice and said withdrawing means, the improvement comprising means for supplying a substantially constant annular converging flow of a gaseous cooling medium to the surface of the emerging tubing comprising two adjacent and concentric tubular rings; an adjustable, annular first gas orifice communicating between said tubular rings; gas inlets in the outer tubular ring; a perforated hollow, right cylinder substantially bisecting the inner tubular ring in a plane normal to the plane of revolution of the inner tubular ring; a baffle means positioned intermediate said first gas orifice and said perforated cylinder and spaced from the walls of said inner tubular ring; a second annular orifice concentric with said tubular rings and with said die orifice; and an annular passageway of diminishing volume with respect to the flow of gas communicating with said second gas orifice and the interior of said inner tubular ring.

References Cited in the file of this patent

UNITED STATES PATENTS

| | | |
|---|---|---|
| 2,632,206 | Pierce | Mar. 24, 1953 |
| 2,770,009 | Rogal et al. | Nov. 13, 1956 |

FOREIGN PATENTS

| | | |
|---|---|---|
| 759,988 | Great Britain | Oct. 24, 1956 |